June 24, 1958      W. NOELL      2,839,982
GARDEN TOOL
Filed July 8, 1955
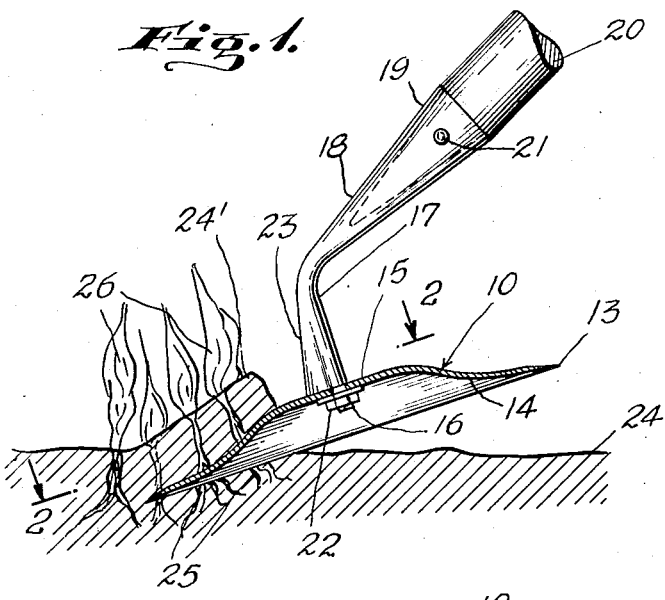
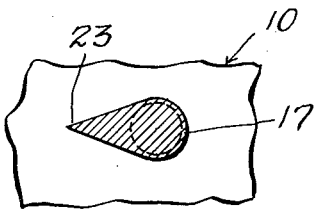
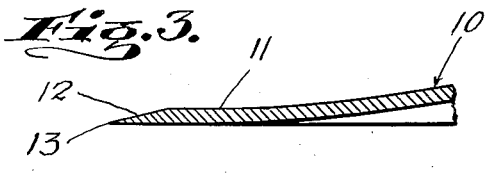
INVENTOR.
WILLIAM NOELL
BY
ATTORNEY

United States Patent Office 2,839,982
Patented June 24, 1958

2,839,982
GARDEN TOOL

William Noell, New Canaan, Conn.

Application July 8, 1955, Serial No. 520,782

1 Claim. (Cl. 97—68)

This invention relates to tools for use in gardening, primarily in severing weeds, trimming edges of beds and/or in cutting sod. More particularly, the invention deals with a tool of the character described, comprising a hollow disc, angularly disposed at the end of a long handle member and, wherein, the shank of the tool, adjacent the disc, includes a cutter knife for severing sod in the operation of cutting sod from a grass patch.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a side and sectional view of a tool made according to my invention, diagrammatically illustrating a method of its use.

Fig. 2 is an enlarged partial section on the line 2—2 of Fig. 1; and

Fig. 3 is an enlarged sectional detailed view of the cutting edge portion of the disc.

In practice, my improved garden tool comprises a hollow disc 10, preferably circular in form and having a short straight outer edge portion 11, bevelled, as seen at 12, to form a sharp cutter edge 13. The body portion, beyond the short straight portion 11, is reversely curved, as indicated at 14 in Fig. 1 of the drawing and joins a short flat central portion 15, which is apertured to receive the threaded end portion 16 of the shank 17 of a handle bracket 18. The bracket 18 includes an upwardly inclined conical socket portion 19 for reception of the conical end of a long handle member 20, a pin, screw or other fastening 21 being employed to retain the bracket 18 against displacement from the handle 20. Suitable means, such for example, as a nut 22, is employed to secure the disc 10 upon the bracket 18 and, when a nut is employed, the disc becomes detachable for replacement, sharpening or other purposes. In some instances, the bracket 18 may be permanently fixed to the disc.

The shank 17 includes an outwardly contracted blade portion 23 which can be utilized in parting sod in the operation of moving the tool through the ground in cutting sod squares or sections from grass, the blade 23 serving to part the sod, particularly in the initial cutting.

It will also be apparent that, by providing the short flat outer end or periphery 11 on the disc, the bevelled edge 12 can be sharpened for a long period of time, thus giving long life to the use of the tool.

In a use of the tool, the disc 10 can be moved down into the soil, as diagrammatically shown at 24 in Fig. 1 of the drawing, in the angular position shown, so as to get beneath and sever the roots 25 of weeds 26. In this operation, the rounded contour of the disc, as at 14, produces a plow-like action, which raises the soil, in the manner indicated at 24′. The soil can be turned over or allowed to drop. In any event, the weeds will perish by virtue of the cutting of the roots. In some instances, the entire disc can be moved into the ground to assume a position substantially parallel to the surface of the ground 24 and moved along a row of a planted garden in timming the weeds that may be present at the sides of the row. With certain types of soil conditions, the disc 10 can be maintained in the submerged position and moved from side to side in a row, simultaneously cutting weeds that may prevail at each side of the row. The tool can also be used in weeding the edges of flower beds and, by disposing the disc in a vertical position, the tool can be utilized in trimming edges of beds.

In cutting sod, the disc is maintained in substantially horizontal position at the depth of sod to be cut and moved around the squares to be formed, so as to completely sever the sod, facilitating hand lifting of the sod, after the same has been cut by the use of the tool. In this connection, it will be apparent that the diameter of the discs can be made to suit various conditions or uses. For most average uses, a disc of seven or eight inches in diameter would be desirable; whereas, larger and smaller diameter discs can be used to care for other specific uses. Small diameter discs can be utilized with short handled hand tools in the trimming or weeding of flower beds. It will also be apparent that the angularity of the disc with respect to the handle member of the tool can be modified to suit various use conditions of the tool.

For purposes of description, the disc may be said to be of inverted dish-shaped form.

Having fully described my invention, what I claim as new and desire to secure by Letters Patent is:

A garden tool, comprising a cutter disc in the form of an inverted dish, a handle bracket fixed centrally of the disc, outer peripheral edges of the disc being bevelled to form a cutter edge, the central portion of the disc being flat, the outer peripheral portion of the disc having a radially short straight wall portion substantially parallel to said flat central portion, the walls of the disc having an abrupt reversely curved central portion between said straight wall portion and the flat central portion thereof in abruptly raising soil therewith in the use of the tool, said handle bracket including a shank portion arranged perpendicularly to the central portion of the disc, the shank having an integral long conical handle receiving portion extending directly from and arranged angularly to said shank, and an outwardly contracted cutter edge extending the major portion of the length of the perpendicular portion of said shank.

References Cited in the file of this patent
UNITED STATES PATENTS

| 620,849 | Long | Mar. 7, 1899 |

FOREIGN PATENTS

| 2,128 | Great Britain | Jan. 31, 1901 |
| 18,372 | Australia | July 18, 1935 |